United States Patent
Kim et al.

(10) Patent No.: US 9,671,632 B2
(45) Date of Patent: Jun. 6, 2017

(54) DISPLAY DEVICE

(71) Applicant: Samsung Display Co., Ltd., Yongin-si, Gyeonggi-do (KR)

(72) Inventors: Wonjin Kim, Hwaseong-si (KR); Cheuljin Park, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/080,834

(22) Filed: Mar. 25, 2016

(65) Prior Publication Data

US 2016/0363803 A1    Dec. 15, 2016

(30) Foreign Application Priority Data

Jun. 11, 2015   (KR) .................. 10-2015-0082684

(51) Int. Cl.
  *G02F 1/1333*   (2006.01)
(52) U.S. Cl.
  CPC .............. *G02F 1/133308* (2013.01); *G02F 2001/13332* (2013.01); *G02F 2001/133317* (2013.01); *G02F 2001/133322* (2013.01)
(58) Field of Classification Search
  CPC ........... G02F 1/333308; G02F 1/13452; G02F 2001/133317; G02F 2001/133322
  See application file for complete search history.

(56) References Cited

U.S. PATENT DOCUMENTS

| | | | | |
|---|---|---|---|---|
| 5,450,221 A | * | 9/1995 | Owen | B60Q 3/044 174/50 |
| 6,549,263 B1 | * | 4/2003 | Kim | G02F 1/133308 349/58 |
| 6,995,814 B2 | * | 2/2006 | Kanatsu | G02F 1/13452 345/104 |
| 7,724,317 B2 | * | 5/2010 | Kim | G02F 1/133308 349/58 |
| 7,960,913 B2 | | 6/2011 | Yee et al. | |
| 2001/0003471 A1 | * | 6/2001 | Lee | G02F 1/133308 349/58 |
| 2004/0114062 A1 | * | 6/2004 | Nishio | G02F 1/133308 349/58 |

(Continued)

FOREIGN PATENT DOCUMENTS

| KR | 1020070055750 A | 5/2007 |
|---|---|---|
| KR | 10200700113568 A | 11/2007 |

(Continued)

*Primary Examiner* — Adrian S Wilson
(74) *Attorney, Agent, or Firm* — Cantor Colburn LLP (57) ABSTRACT

A display device includes: a display panel including a display area in which an image is displayed and a pad area in which an image is not displayed; an intermediate frame member on which the display panel is disposed; and an upper frame member which covers the pad area and is coupled to the intermediate frame member. The intermediate frame member may define: a first side wall portion thereof extended along a first side of the display panel; and a second side wall portion thereof extended along a second side of the display panel, the second sidewall portion connected to the first side wall portion in the pad area and a height of the second side wall portion being less than a height of the first side wall portion. The upper frame member which covers the pad area is coupled to the second side wall portion.

16 Claims, 5 Drawing Sheets

(56) References Cited

U.S. PATENT DOCUMENTS

| | | | | |
|---|---|---|---|---|
| 2005/0062902 A1* | 3/2005 | Fukayama | ........ | G02F 1/133308 349/58 |
| 2006/0139271 A1* | 6/2006 | Okuda | .............. | G02F 1/133308 345/88 |
| 2008/0043413 A1* | 2/2008 | Okuda | .............. | G02F 1/133308 361/679.01 |
| 2013/0027965 A1* | 1/2013 | Noh | .................. | G02F 1/133385 362/602 |
| 2014/0362325 A1* | 12/2014 | Lee | ................... | G02F 1/133308 349/58 |

FOREIGN PATENT DOCUMENTS

| | | |
|---|---|---|
| KR | 1020100019729 A | 2/2010 |
| KR | 1020130046240 A | 5/2013 |

* cited by examiner

FIG. 7

DISPLAY DEVICE

This application claims priority to Korean Patent Application No. 10-2015-0082684, filed on Jun. 11, 2015, and all the benefits accruing therefrom under 35 U.S.C. §119, the contents of which in their entirety are herein incorporated by reference.

BACKGROUND

1. Field

Exemplary embodiments of the invention relate to a display device which includes a narrow bezel and also protects a driving chip and a driving chip mounting film thereof.

2. Description of the Related Art

Liquid crystal display ("LCD") devices are a type among flat panel display ("FPD") devices that have found a wide range of applications. An LCD device includes two substrates including electrodes disposed therein and a liquid crystal layer interposed therebetween, and upon applying voltage to the electrodes, liquid crystal molecules in the liquid crystal layer are rearranged to adjust the amount of light transmitted therethrough.

The LCD device, which is a passive-type light emitting device, includes a display panel which displays images, an intermediate frame on which the display panel is mounted, and a backlight assembly which provides light to the display panel. The intermediate frame is coupled to a lower frame that forms a framework of the backlight assembly, using a coupling structure such as a hook.

SUMMARY

One or more exemplary embodiments of the invention are directed to a display device including an upper frame which provides a narrow bezel of the display device and also protects a driving chip mounting film and a driving chip of the display device.

According to an exemplary embodiment of the invention, a display device includes: a display panel including a display area in which an image is displayed and a pad area in which an image is not displayed; an intermediate frame member on which the display panel is disposed; and an upper frame member which covers the pad area and is coupled to the intermediate frame member. The intermediate frame member may define: a first side wall portion thereof extended along a first side of the display panel; and a second side wall portion thereof extended along a second side of the display panel different from the first side thereof, the second sidewall portion connected to the first side wall portion in the pad area and a height of the second side wall portion being less than a height of the first side wall portion. The upper frame member which covers the pad area is coupled to the second side wall portion of the intermediate frame member.

In a coupled state of the upper frame member and the intermediate frame member, an upper surface of the upper frame member may be disposed coplanar with an upper surface of the first side wall portion of the intermediate frame member.

In the pad area, a thickness of the second side wall portion may be less than a thickness of the first side wall portion.

In the coupled state of the upper frame member and the intermediate frame member, an total thickness of the upper frame member and the second side wall portion may be substantially the same as the thickness of the first side wall portion.

The intermediate frame member may further define a support portion thereof which protrudes from an inner surface of the first side wall portion and protrudes from an inner surface of the second side wall portion and supports the display panel thereon.

The pad area may be disposed at the second side of the display area.

The display device may further include a driving chip mounting film which is connected to the pad area at the second side of the display panel and applies a driving signal to the display panel.

The upper frame member may cover the driving chip mounting film connected to the pad area at the second side of the display panel.

The second side wall portion may define a mounting groove therein.

The driving chip mounting film connected to the pad area at the second side of the display panel may extend through the mounting groove.

The driving chip mounting film extended through the mounting groove may be bent at the mounting groove to be disposed between the second side wall portion and the upper frame member at the second side of the display panel.

The display device may further include a printed circuit board connected to the driving chip mounting film connected to the pad area at the second side of the display panel.

The first side wall portion and the second side wall portion may surround the display panel.

The upper frame member may cover an upper surface and a side surface of the second side wall portion of the intermediate frame member and expose an upper surface and a side surface of the first side wall portion of the intermediate frame member.

The display device may further include a lower frame member which is coupled to the intermediate frame member and defines an accommodating space with the first and second side wall portions of the intermediate frame member.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features of the present disclosure of invention will be more clearly understood from the following detailed description taken in conjunction with the accompanying drawings, in which.

DETAILED DESCRIPTION

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In order to secure competitiveness of a product, development of liquid crystal display ("LCD") devices that are relatively slim and light-weight has progressed. In particular, development is being conducted so as to decrease an overall exterior size of an LCD device by decreasing a bezel thereof, which corresponds to a planar width between an outer shape of the LCD device and an active area at which a display screen actually displays an image. In order to achieve a narrow bezel, a structure in which an upper frame covering an edge portion of a display panel is absent is applied to the LCD device. However, when the upper frame is absent, protecting a driving chip mounting film of the LCD device that is disposed at a side among four sides of the display panel is difficult.

Hereinafter, an exemplary embodiment of a display device according to the invention will be described with reference to FIGS. 1 to 7.

Figure 1:
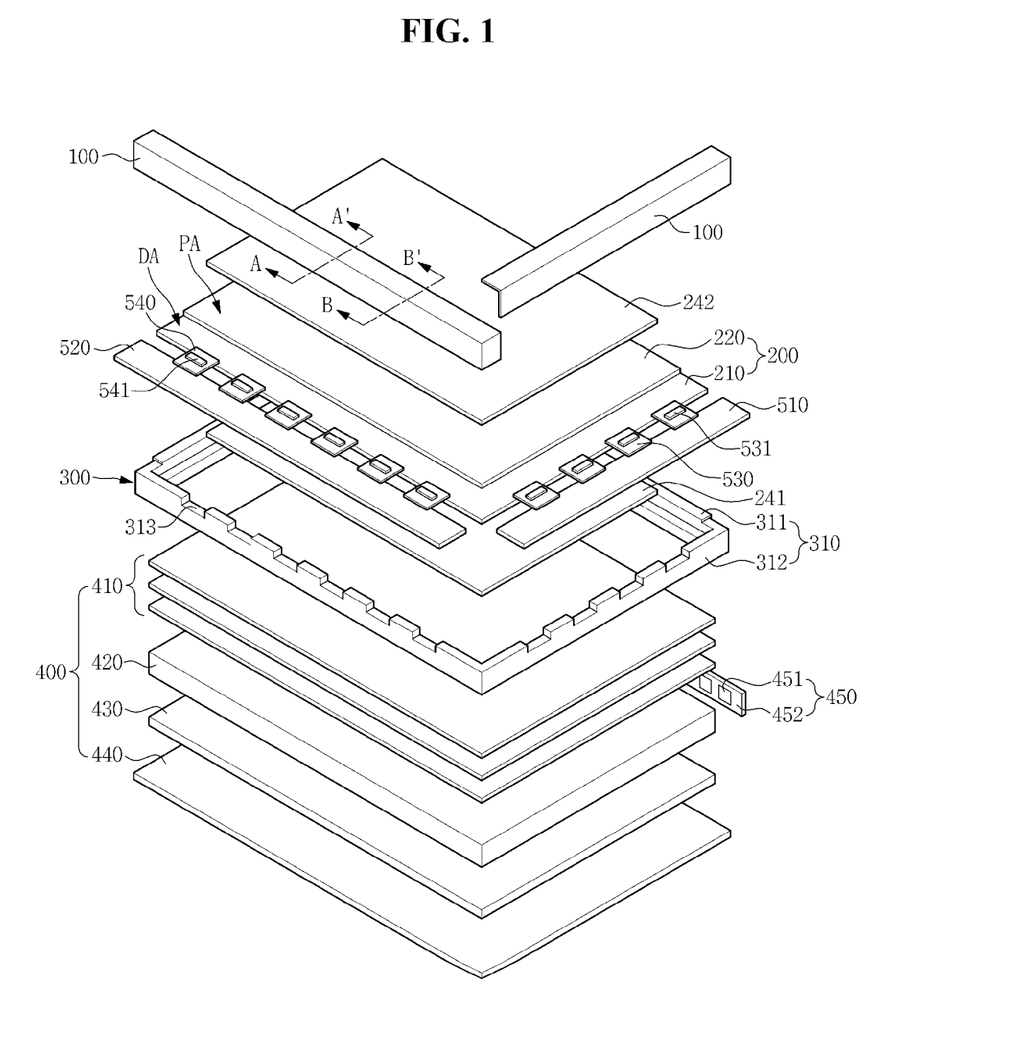
FIG. 1 is an exploded perspective view illustrating an exemplary embodiment of a display device according to the invention.
Figure 2:
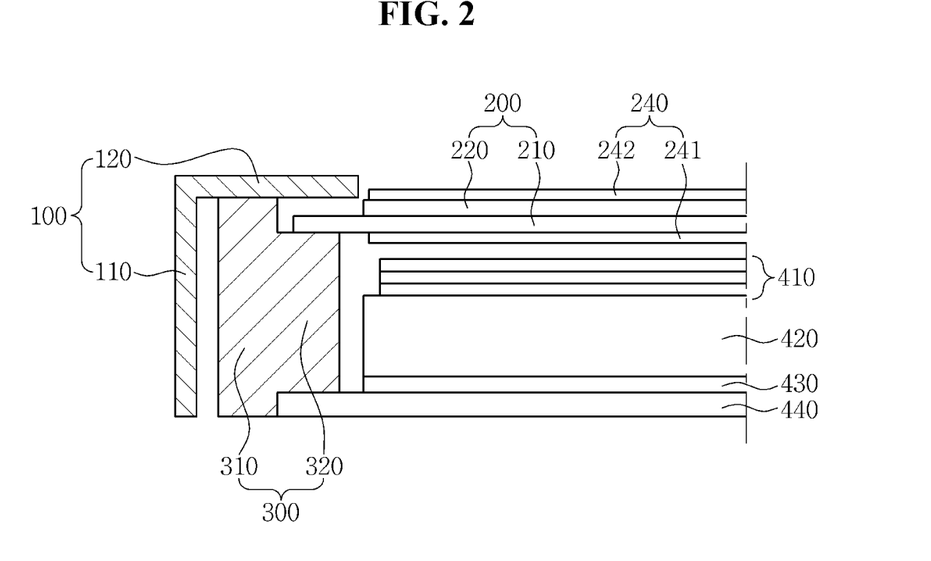
FIG. 2 is a cross-sectional view taken along line A-A' of FIG. 1.

FIG. 1 is an exploded perspective view illustrating an exemplary embodiment of a display device according to the invention; FIG. 2 is a cross-sectional view taken along line A-A' of FIG. 1; and FIG. 3 is a cross-sectional view taken along line B-B' of FIG. 1.

Figure 3:
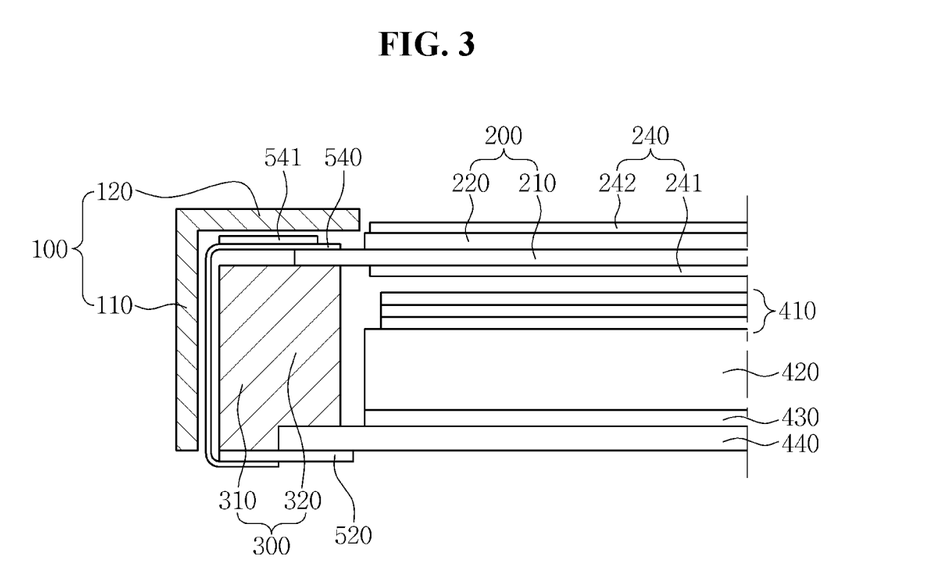
FIG. 3 is a cross-sectional view taken along line B-B' of FIG. 1.

In reference to FIGS. 1, 2 and 3, the display device includes a display panel 200 configured to display an image using light, a backlight assembly 400 which generates and provides the light to the display panel 200, an upper frame member 100 surrounding a portion of the display panel 200, and an intermediate frame member 300 on which the display panel 200 is mounted.

The upper frame member 100 covers a portion of the display panel 200 and is coupled to the intermediate frame member 300. The upper frame member 100 may be provided in plural to cover portions of the display panel 200.

The display panel 200 is configured to display an image with light. The display panel 200, which is a light-receiving type display panel, may include a liquid crystal display ("LCD") panel, an electrowetting display panel, an electrophoretic display ("EPD") panel, a microelectromechanical system ("MEMS") display panel and the like. Herein, an LCD panel will be described by way of example in the exemplary embodiment.

The display panel 200 may be provided in a quadrangular planar shape having two pairs of parallel sides. According to the exemplary embodiment, the display panel 200 may have a rectangular shape defining a pair of relatively long sides and a pair of relatively short sides. The display panel 200 includes a first display substrate 210, a second display substrate 220 opposing the first display substrate 210, and a liquid crystal layer (not illustrated) between the first display substrate 210 and the second display substrate 220. The display panel 200, when viewed in a top plan view, includes a display area PA in which an image is displayed and a non-display area in which an image is not displayed and which surrounds the display area PA to exclude the display area PA. The non-display area includes a pad area DA, and the pad area DA is an area at which driving chip mounting films 530 and 540 are disposed.

The first display substrate 210 may include a plurality of pixel electrodes (not illustrated) and a plurality of thin film transistors (not illustrated) which is electrically connected to the pixel electrodes in one-to-one correspondence, on a first base substrate. The first display substrate 210 may further include a data line connected to a source electrode of the thin film transistor, a gate line connected to a gate electrode of the thin film transistor and a pixel electrode connected to a drain electrode of the thin film transistor. Each of the thin film transistors functions as a switch of a driving signal supplied to a corresponding one of the pixel electrodes. Further, the second display substrate 220 may include a common electrode (not illustrated) which forms an electric field which controls an alignment of liquid crystals, along with the pixel electrodes, on a second base substrate. The display panel 200 is configured to drive the liquid crystal layer to display an image frontwards.

The display panel 200 includes driving chips 531 and 541 configured to supply a driving signal, the driving chip mounting films 530 and 540 on which the driving chips 531 and 541 are respectively mounted, and printed circuit boards 510 and 520 electrically connected to the display panel 200 through the driving chip mounting films 530 and 540. The driving chip mounting films 530 and 540 may be a tape carrier package ("TCP") but the invention is not limited thereto.

The driving chip mounting films 530 and 540 are extended to be bent at an end portion of the display panel 200 and to be disposed on a side surface of the intermediate frame member 300. The printed circuit boards 510 and 520 may be disposed on a lower surface of the lower frame member 440.

The driving chips 531 and 541 generate a driving signal for driving the display panel 200 in response to an external signal applied thereto. The external signal is supplied from the printed circuit boards 510 and 520 and may include an image signal, various control signals, a driving voltage and the like.

In an exemplary embodiment, for example, the gate printed circuit board 510 is connected to the gate driving chip mounting film 530. The gate printed circuit board 510 applies an image signal to the gate driving chip 531 through the gate driving chip mounting film 530. The data printed circuit board 520 is connected to the data driving chip mounting film 540. The data printed circuit board 520 applies an image signal to the data driving chip 541 through the data driving chip mounting film 540.

The gate driving chip 531 receives an image signal to apply a gate driving signal to the gate line of the display panel 200. The data driving chip 541 receives an image signal to apply the data driving signal to the data line of the display panel 200.

A polarizer 240 is disposed on the display panel 200, and collectively includes a first polarizer 241 and a second polarizer 242. The first polarizer 241 and the second polarizer 242 are disposed on surfaces of the first and second display substrates 210 and 220 that are opposite to surfaces of the first and second display substrates 210 and 220 facing one another, respectively. That is, the first polarizer 241 may be attached to an outer side of the first display substrate 210 and the second polarizer 242 may be attached to an outer side of the second display substrate 220. A transmissive axis of the first polarizer 241 may be substantially perpendicular with respect to a transmissive axis of the second polarizer 242.

The intermediate frame member 300 is coupled to the lower frame member 440 and accommodates the display panel 200 therein. The intermediate frame member 300 may include or be formed of a flexible material, such as plastic, in order to reduce or effectively prevent damage to the display panel 200.

The intermediate frame member 300 is provided along an edge of the display panel 200 and supports the display panel 200 from therebelow. The intermediate frame member 300 may be provided in positions corresponding to four sides or at least one among the four sides of the display panel 200. In an exemplary embodiment, for example, the intermediate frame member 300 may have a quadrilateral loop shape corresponding to the four sides of the display panel 200.

The backlight assembly 400 includes an optical sheet 410, a light guide plate 420, a reflective sheet 430, the lower frame member 440 and a light source unit 450.

The light source unit 450 includes a light source 451 and a circuit board 452 on which the light source 451 is disposed. The light source unit 450 may be disposed at an edge portion or at a light incident side surface of the light guide plate 420. That is, the light source unit 450 may emit light towards the edge portion or the light incident side surface of the light guide plate 420.

The light source 451 may include at least one light emitting diode ("LED") chip (not illustrated) and a package (not illustrated) which accommodates the LED chip. In an exemplary embodiment, for example, the light source 451 may have a light emitting surface facing a direction where the light guide plate 420 is positioned. Light generated and emitted from the light source 451 may be blue light but the invention is not limited thereto.

The circuit board 452, for example, may include a printed circuit board ("PCB") or a metal PCB.

The light source unit 450 may be disposed to correspond to a single side surface, two side surfaces, or each of four side surfaces of the light guide plate 420 or at least at one of the edge portions of the light guide plate 420, in consideration of the size, luminance, and uniformity of the display panel 200.

Light generated and emitted from the light source 451 may be incident on a light-incident side surface of the light guide plate 420 and guided therein to be emitted from a light emitting surface thereof. The light guide plate 420 may be configured to uniformly supply light supplied from the light source unit 450 to the display panel 200. The light guide plate 420 may be disposed adjacent to the light source unit 450 and accommodated in the lower frame member 440. The light guide plate 420 may be provided, for example, in a quadrilateral panel form as the display panel 200, but is not limited thereto. The light guide plate 420 may define the light emitting surface thereof, a rear surface thereof opposing the light emitting surface thereof, and the four side surfaces thereof which connect the light emitting surface to the rear surface. In some embodiments, when an LED is used as the light source 451, the light guide plate 420 may have various forms defined therein including a predetermined groove and/or a protrusion according to a position of the light source 451.

Although referred to as a "plate" such as having a relatively large cross-sectional thickness for ease of description, the light guide plate 420 is not limited thereto. According to an alternative exemplary embodiment, the light guide plate 420 may be provided in a shape of a sheet or a film for which the cross-sectional thickness is smaller than that of the plate and is relatively small as compared to the planar size thereof so as to achieve slimness of the display device. That is, the light guide plate 420 is to be understood as having a concept that includes not only a plate but also a film which guides light provided from the light source unit 450.

The light guide plate 420 may include a light-transmissive material. The light-transmissive material may include an acrylic resin, such as polymethylmethacrylate ("PMMA"), or polycarbonate ("PC") so as to guide light efficiently.

A pattern may be disposed on or defined in at least one surface of the light guide plate 420. In an exemplary embodiment, for example, a scattering pattern (not illustrated) may be defined on a lower surface thereof, so as to scatter and/or reflect the guided light upwards.

The optical sheet 410 may be disposed on the light guide plate 420 and configured to diffuse and/or collimate light directed from the light guide plate 420. The optical sheet 410 may collectively include a diffusion sheet, a prism sheet, a protective sheet and/or other functional sheets.

The diffusion sheet is configured to disperse light guided from the light guide plate 420 to thereby reduce or effectively prevent the light from being partly concentrated.

The prism sheet may include prisms having a triangular cross-section and arranged in a predetermined array on one surface thereof. The prism sheet may be disposed on the diffusion sheet and may collimate light diffused from the diffusion sheet in a direction perpendicular to the display panel 200.

The protective sheet may be disposed on the prism sheet and may serve to protect a surface of the prism sheet and diffuse light to achieve uniform light distribution.

The reflective sheet 430 may be disposed between the light guide plate 420 and the lower frame member 440 and reflect light emitted downwards from the light guide plate 420 to be re-directed toward the display panel 200, thereby improving light efficiency.

The reflective sheet 430 may include, for example, polyethylene terephthalate ("PET"), and thus may have reflectivity. One surface of the reflective sheet 430 body may be coated with a diffusion layer including, for example, titanium dioxide.

In some embodiments, the reflective sheet 430 body may include or be formed of a material containing metal, such as silver (Ag).

The lower frame member 440 may accommodate the optical sheet 410, the reflective sheet 430 and the light guide plate 420 thereon. The lower frame member 440 may have a planar plate form. The lower frame member 440 may include a relatively rigid metal material, such as stainless steel, or a material having good heat dissipation properties, such as aluminum or an aluminum alloy. According to the exemplary embodiment, the lower frame member 440 is responsible for maintaining an overall framework of the display device and protecting a variety of components accommodated thereon.

With the above-described configuration of the display device, a configuration of the upper frame member 100 and the intermediate frame member 300 together configured to protect the driving chips 531 and 541 and the driving chip mounting films 530 and 540 while achieving a narrow bezel will be described in detail with reference to FIGS. 4, 5, 6 and 7.

Figure 4:
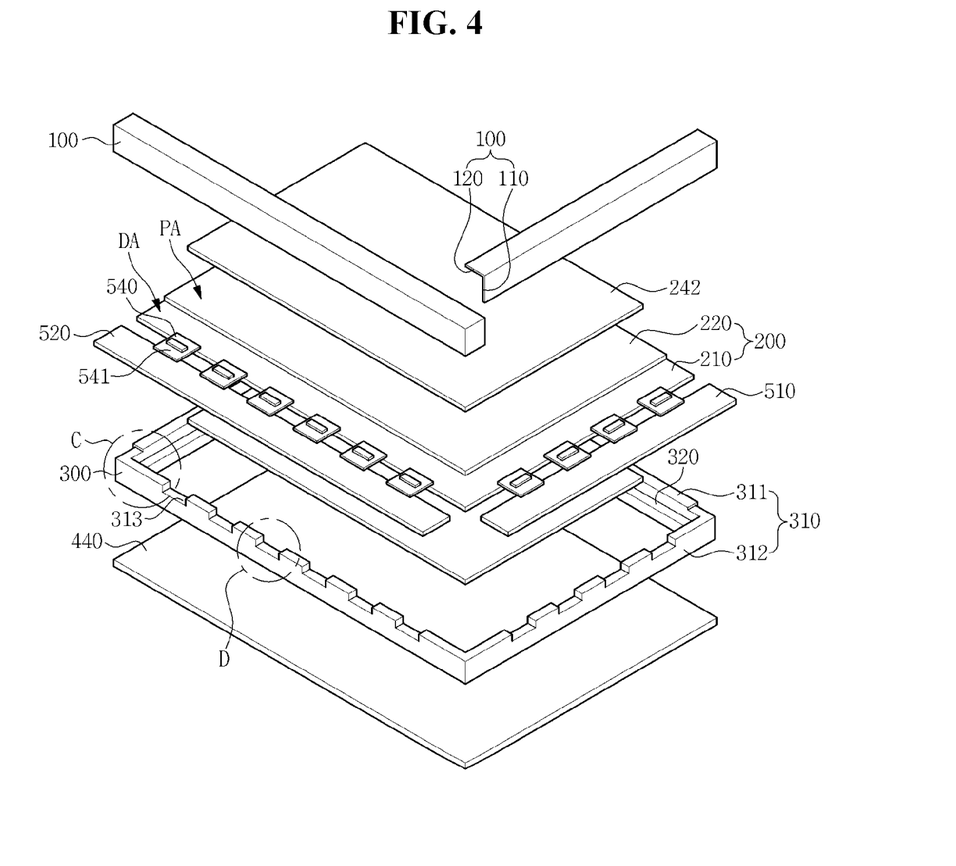
FIG. 4 is an exploded perspective view illustrating an exemplary embodiment of a display panel, an upper frame member, an intermediate frame member and a lower frame member of a display device according to the invention.
Figure 5:
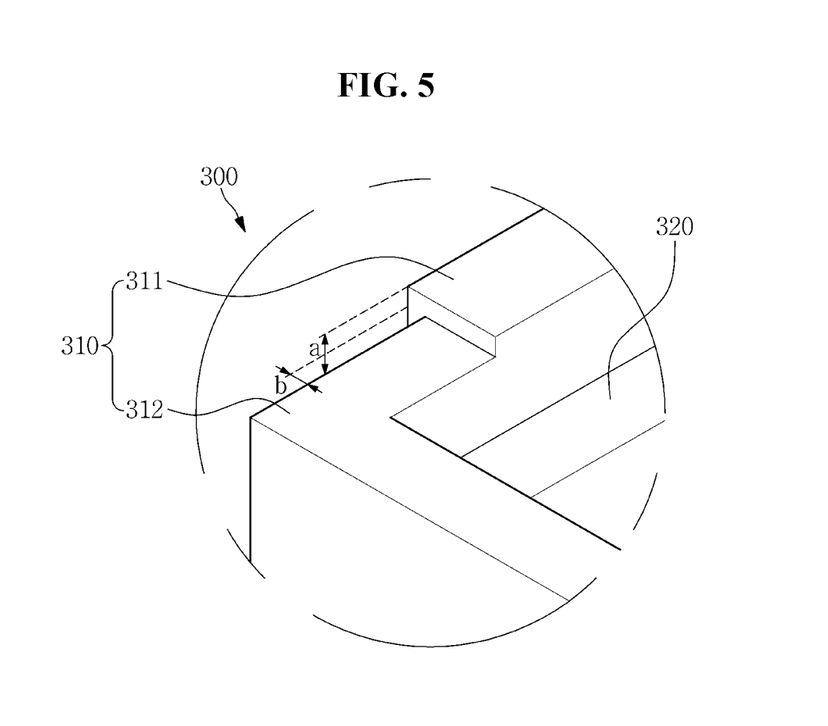
FIG. 5 is an enlarged perspective view illustrating a portion C of FIG. 4.
Figure 6:
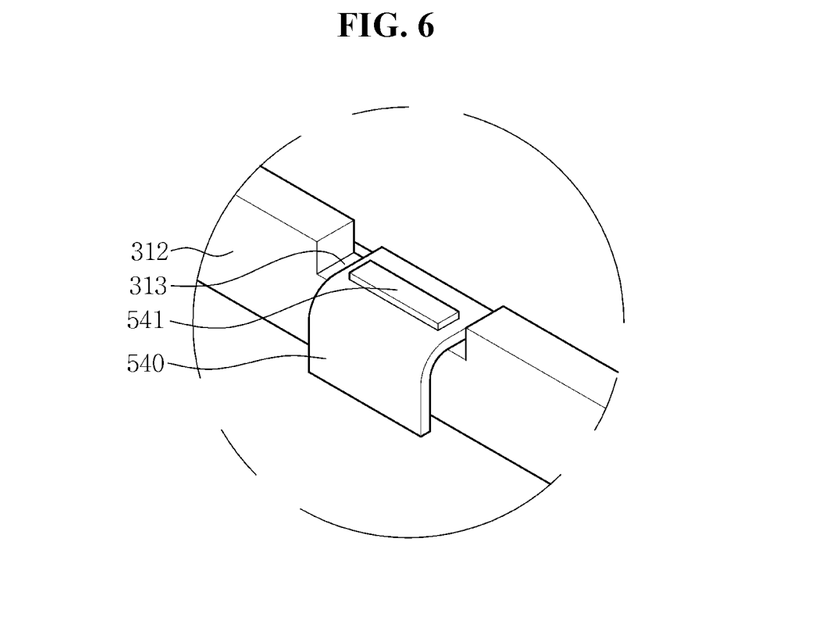
FIG. 6 is an enlarged perspective view illustrating a portion D of FIG. 4.
Figure 7:
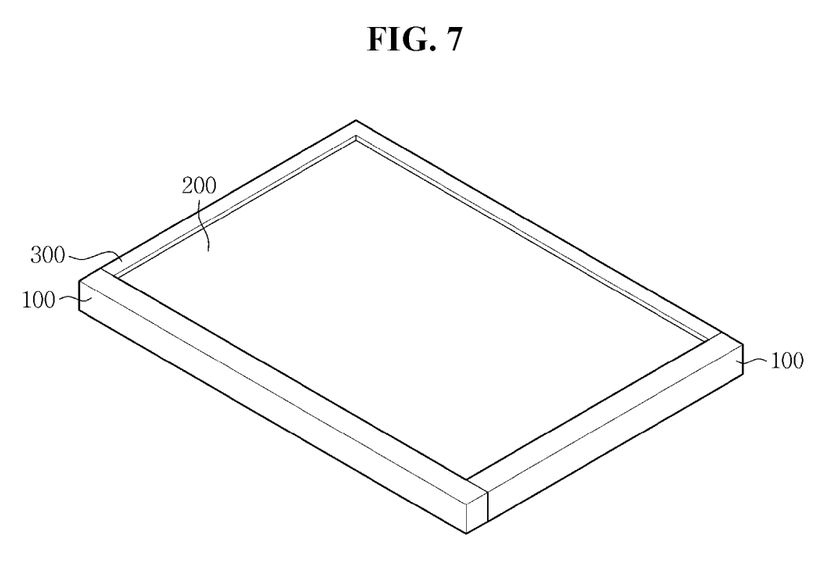
FIG. 7 is a perspective view illustrating an exemplary embodiment of an assembled state of the display panel, the upper frame member, the intermediate frame member and the lower frame member of a display device according to the invention.

FIG. 4 is an exploded perspective view illustrating a display panel, an upper frame member, an intermediate frame member and a lower frame member of a display device. FIG. 5 is an enlarged perspective view illustrating a portion C of FIG. 4. FIG. 6 is an enlarged perspective view illustrating a portion D of FIG. 4. FIG. 7 is a perspective view schematically illustrating an exemplary embodiment of an assembled state of the display panel, the upper frame member, the intermediate frame member and the lower frame member. Some elements shown in FIG. 1 may be omitted or may be unlabeled in FIGS. 4, 5, 6 and 7 for convenience of illustration.

In reference to FIGS. 4, 5, 6 and 7, the upper frame member 100 according to the exemplary embodiment is disposed on the pad area DA and covers the driving chip mounting films 530 and 540 and the driving chips 531 and 541. The upper frame member 100 includes an edge portion 110 and a protrusion portion 120 which is bent from the edge portion 110 to extend therefrom. The upper frame member 100 may define the edge portion 110 thereof and the protrusion portion 120 thereof.

The intermediate frame member 300 according to the exemplary embodiment includes a side wall portion 310 and a support portion 320. The intermediate frame member 300 may define the side wall portion 310 thereof and the support portion 320 thereof.

The side wall portion 310 is disposed on an edge portion of the lower frame member 440 and defines an accommodation space with the lower frame member 440. The side wall portion 310, as illustrated in FIGS. 2 and 3, surrounds the optical sheet 410, the light guide plate 420, the reflective sheet 430 and the display panel 200. An inner surface of the side wall portion 310 faces outer side surfaces of each of the optical sheet 410, the light guide plate 420, the reflective sheet 430 and the display panel 200.

The side wall portion 310 collectively includes a first side wall portion 311 and a second side wall portion 312. The first side wall portion 311 and the second side wall portion 312 are connected to each other, and define an accommodation space with the lower frame member 440. The side wall portion 310 may define the first side wall portion 311 thereof and the second side wall portion 312 thereof.

The first side wall portion 311 is disposed at a side surface of the display panel 200 on which the pad area DA is absent. The second side wall portion 312 is disposed on the pad area DA and is connected to the first side wall portion 311. Taken from a common surface, such as a lower surface of the intermediate frame member 300, the second side wall portion 312 has a lower height than that of the first side wall portion 311.

A respective length of the first side wall portion 311 and the second side wall portion 312 extends in an extension direction thereof. A respect width (e.g., thickness) of the first side wall portion 311 and the second side wall portion 312 extends perpendicular to the extension direction thereof. The height of the side wall portion 310 may be orthogonal to both the length and the width thereof. The thickness of the second side wall portion 312 is less than the thickness of the first side wall portion 311. The thickness extends from the accommodation space defined by the side wall portion 310 and the lower frame member 440, to an outer side surface of the intermediate frame member 300 and may be a maximum thickness at a particular point along the length thereof.

The second side wall portion 312 has a mounting groove 313 defined in plural therein. The driving chip mounting films 530 and 540 are extended from the display panel 200 to be disposed in the mounting grooves 313, respectively, and bent at the mounting groove 313 to be disposed between the second side wall portion 312 and the upper frame member 100.

The support portion 320 protrudes toward the accommodation space from each of an inner side surface of the first side wall portion 311 and an inner side surface of the second side wall portion 312 and supports the display panel 200 thereon.

The upper frame member 100 is coupled to the second side wall portion 312 of the intermediate frame member 300 having the above-described configuration. Referring again to FIGS. 2 and 3, for example, the upper frame member 100 covers an upper surface and a side surface of the second side wall portion 312. As illustrated in FIG. 6, the mounting grooves 313 are recessed from the upper surface of the second side wall portion 312.

The upper surface of the second side wall portion 312 may be disposed at a maximum height thereof from the lower surface of the intermediate frame member 300. An upper surface of the first side wall portion 311 may be dispsoed at a maximum height thereof from the lower surface of the intermediate frame member 300. In thickness direction of the display device, a height difference "a" between upper surfaces of the first side wall portion 311 and the second side wall portion 312 is substantially the same as a thickness of the protrusion portion 120 of the upper frame member 100. Accordingly, as illustrated in FIG. 7, the upper frame member 100 is coupled to the lower height second side wall portion 312 to be disposed coplanar with an upper surface of the first side wall portion 311. An upper surface of the protrusion portion 120 of the upper frame member 100 and the upper surface of the first side wall portion 311 of the intermediate frame member 300 collectively form a coplanar surface of the display device. The upper surfaces of the protrusion portion 120 and the first side wall portion 311 form an entire of the upper surface of the display device by which the bezel of the display device is defined. While the upper frame member 100 covers upper and side surfaces of the second side wall member 312, upper and side surfaces of the first side wall member 311 are exposed from the upper frame member 100.

Further, referring again to FIG. 5, a thickness difference "b" between thicknesses of the first side wall portion 311 and the second side wall portion 312 is substantially the same as the thickness of the edge portion 110 of the upper frame member 100. The outermost surface of the second side wall portion 312 is recessed from the outermost surface of the first side wall portion 311 to define the thickness difference "b" therebetween. The thickness of the edge portion 110 of the upper frame member 100 is disposed in the recess defined by the thickness difference "b". Accordingly, at a transiton area between the first side wall portion 311 and the second side wall portion 312, a total thickness of the upper frame member 100 and the second side wall portion 312 in an assembled state thereof is substantially the sams as an overall thickness of the first side wall portion 311.

As the intermediate frame member 300 and the upper frame member 100 are coupled to each other in such a manner, a relatively narrow bezel of the display device may be achieved, and simultaneously, the driving chip mounting films 530 and 540 and the driving chips 531 and 541 disposed on the pad area DA may be protected within the display device.

Referring again to FIG. 4, the pad area DA is described as being disposed on two sides of the display panel 200, but the pad area DA may be disposed on one, three or four sides of the display panel 200 based on the type of the display device. In an exemplary embodiment, for example, where the pad area DA is disposed on three sides of the display panel 200, three upper frame members 100 may be disposed on the pad areas DA, respectively, and the second side wall portion 312 may be disposed at the three sides of the intermediate frame member 300 corresponding to the pad areas DA.

Since outer side surfaces of the upper frame member 100 and the intermediate frame member 300 define a whole of an overall outer side surface of the display device, such outer side surfaces may be coplanar with each other, as illustrated in FIG. 7. To achieve the overall coplanar outer side surface of the display device, ends of the upper frame members 100 may be open or closed. Referring to FIGS. 1, 4 and 7, for example, both ends of a first upper frame member 100 disposed where the driving chip mounting film 540 is located are closed. For a second upper frame member 100 disposed where the driving chip mounting film 530 is located, a first end thereof adjacent to the first upper frame member 100 is open while a second end thereof opposite to the first end is closed.

As set forth above, according to exemplary embodiments, the display device may define a narrow bezel thereof and also simultaneously protect a driving chip and a driving chip mounting film thereof.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
a display panel including a display area in which an image is displayed and a pad area in which an image is not displayed;
an intermediate frame member on which the display panel is disposed; and
an upper frame member which covers the pad area and is coupled to the intermediate frame member,
wherein the intermediate frame member defines:
a first side wall portion thereof extended along a first side of the display panel; and
a second side wall portion thereof extended along a second side of the display panel different from the first side thereof, the second sidewall portion connected to the first side wall portion in the pad area and a height of the second side wall portion being less than a height of the first side wall portion,
wherein the upper frame member which covers the pad area is coupled to the second side wall portion of the intermediate frame member.

2. The display device of claim 1, wherein in a coupled state of the upper frame member and the intermediate frame member, an upper surface of the upper frame member is disposed coplanar with an upper surface of the first side wall portion of the intermediate frame member.

3. The display device of claim 2, wherein at the pad area, a thickness of the second side wall portion is less than a thickness of the first side wall portion.

4. The display device of claim 3, wherein in the coupled state of the upper frame member and the intermediate frame member, a total thickness of the upper frame member and the second side wall portion is substantially the same as the thickness of the first side wall portion.

5. The display device of claim 4, wherein the intermediate frame member further defines a support portion which protrudes from an inner surface of the first side wall portion and protrudes from an inner surface of the second side wall portion and supports the display panel thereon.

6. The display device of claim 4, wherein the pad area is disposed at the second side of the display area.

7. The display device of claim 6, further comprising a driving chip mounting film which is connected to the pad area at the second side of the display panel and applies a driving signal to the display panel.

8. The display device of claim 7, wherein the upper frame member covers the driving chip mounting film connected to the pad area at the second side of the display panel.

9. The display device of claim 8, wherein the second side wall portion defines a mounting groove therein.

10. The display device of claim 9, wherein the driving chip mounting film connected to the pad area at the second side of the display panel extends through the mounting groove.

11. The display device of claim 10, wherein the driving chip mounting film extended through the mounting groove is bent at the mounting groove to be disposed between the second side wall portion and the upper frame member at the second side of the display panel.

12. The display device of claim 11, further comprising a printed circuit board connected to the driving chip mounting film disposed between the second side wall portion and the upper frame member at the second side of the display panel.

13. The display device of claim 1, wherein the first side wall portion and the second side wall portion surround the display panel.

14. The display device of claim 1, wherein the upper frame member covers an upper surface and a side surface of the second side wall portion of the intermediate frame member and exposes an upper surface and a side surface of the first side wall portion of the intermediate frame member.

15. The display device of claim 1, further comprising a lower frame member which is coupled to the intermediate frame member and defines an accommodating space with the first and second side wall portions of the intermediate frame member.

16. A method of manufacturing a display device, comprising:
    providing an intermediate frame member on which a display panel is disposed, the display panel including a display area in which an image is displayed and a pad area in which an image is not displayed,
    the intermediate frame member defining a first side wall portion thereof extending along an edge of the display area and having a first upper surface at a first height, the first sidewall portion further extending along the pad area to define a second side wall portion of the intermediate frame member, the second side wall portion having a second upper surface recessed from the first upper surface to define a second height less than the first height;
    disposing a chip mounting film connected to the pad area of the display panel and extending over the second side wall portion of the intermediate frame member; and
    coupling an upper frame member to the intermediate frame member, wherein in a coupled state of the upper frame member and the intermediate frame member,
    the upper frame member covers the second side wall portion extending along the pad area of the display panel and exposes the first side wall portion extending along the edge of the display area of the display panel, and
    a total thickness of the upper frame member and the second side wall portion at the pad area is substantially the same as the thickness of the first side wall portion.

* * * * *